US009555586B2

(12) United States Patent
Richard et al.

(10) Patent No.: US 9,555,586 B2
(45) Date of Patent: Jan. 31, 2017

(54) COMPOSITE CONNECTING ROD HAVING AN INCREASED MECHANICAL STRENGTH

(75) Inventors: Masson Richard, Velizy Villacoublay (FR); Garnier Gildas, Velizy Villacoublay (FR); Desjoyeaux Bertrand, Sainte-Adresse (FR)

(73) Assignees: MESSIER-BUGATTI-DOWTY, Velizy-Villacoublay (FR); AIRCELLE, Gonfreville l'Orcher (FR)

( * ) Notice: Subject to any disclaimer, the term of this patent is extended or adjusted under 35 U.S.C. 154(b) by 258 days.

(21) Appl. No.: 14/235,232

(22) PCT Filed: Jul. 31, 2012

(86) PCT No.: PCT/EP2012/064975
§ 371 (c)(1),
(2), (4) Date: Apr. 1, 2014

(87) PCT Pub. No.: WO2013/017601
PCT Pub. Date: Feb. 7, 2013

(65) Prior Publication Data
US 2014/0225297 A1 Aug. 14, 2014

(30) Foreign Application Priority Data
Aug. 1, 2011 (FR) ...................................... 11 57055

(51) Int. Cl.
*B29C 70/28* (2006.01)
*B29B 11/16* (2006.01)
(Continued)

(52) U.S. Cl.
CPC ............... *B29C 70/28* (2013.01); *B29B 11/16* (2013.01); *B29C 69/005* (2013.01); *B29C 70/24* (2013.01);
(Continued)

(58) Field of Classification Search
CPC ........ B29C 69/005; B29C 70/24; B29C 70/30; B29B 11/16; F16C 7/026
See application file for complete search history.

(56) References Cited

U.S. PATENT DOCUMENTS

| 5,543,005 A | * | 8/1996 | Monget | ................. B29C 70/228 112/412 |
| 2009/0102092 A1 | * | 4/2009 | Westerdahl | ......... B29C 65/7832 264/258 |
| 2009/0223588 A1 | * | 9/2009 | Dunleavy | ............... F16C 7/026 139/384 R |

FOREIGN PATENT DOCUMENTS

| FR | 2 893 532 A1 | 5/2007 |
| WO | 2010/009900 A1 | 1/2010 |

OTHER PUBLICATIONS

International Search Report of PCT/EP2012/064975 dated Nov. 13, 2012.

* cited by examiner

*Primary Examiner* — Matthew Daniels
(74) *Attorney, Agent, or Firm* — Sughrue Mion, PLLC

(57) ABSTRACT

A method of fabricating a connecting rod (6) out of composite material using three-dimensional fabric of woven reinforcing fibers, the connecting rod (6) extending in a main direction. The method comprises the steps of: cutting out one or more base pieces (7, 8) from a three-dimensional fabric; cutting out one or more reinforcing pieces (9, 10) from a three-dimensional fabric; installing the various pieces (7, 8, 9, 10) on a support in order to shape them; securing the various pieces (7, 8, 9, 10) to one another by stitching (12, 13, 14, 15) using reinforcing fibers in order to constitute a reinforcing fiber preform; installing the preform on a mandrel; and injecting resin into the preform and polymerizing the resin.

10 Claims, 3 Drawing Sheets

(51) Int. Cl.
*B29C 70/24* (2006.01)
*F16C 7/02* (2006.01)
*B29C 69/00* (2006.01)
B29C 70/48 (2006.01)
B29L 31/06 (2006.01)

(52) U.S. Cl.
CPC ............... *F16C 7/026* (2013.01); *B29C 70/48* (2013.01); *B29L 2031/06* (2013.01); *F16C 2220/04* (2013.01); *F16C 2220/28* (2013.01)

COMPOSITE CONNECTING ROD HAVING AN INCREASED MECHANICAL STRENGTH

CROSS REFERENCE TO RELATED APPLICATIONS

This application is a National Stage of International Application No. PCT/EP2012/064975 filed Jul. 31, 2012, claiming priority based on French Patent Application No. 11 57055, filed Aug. 1, 2011, the contents of all of which are incorporated herein by reference in their entirety.

The invention relates to a method of fabricating a composite material connecting rod made of fabric woven from reinforcing fibers such as carbon fibers.

BACKGROUND OF THE INVENTION

Such a connecting rod, shown in FIG. 1 with the reference 1, has a generally tubular hollow main body 2 extending along a general direction AX and extended at each of its ends by respective two-lug clevises, these clevises being given references 3 and 4.

In a method known from patent document FR 2 893 532, the connecting rod is fabricated using a piece of reinforcing fiber fabric that is cut to have a shape as shown in FIG. 2. This shape comprises a central portion for the hollow main body 2 and four extensions, each corresponding to a respective one of the clevis lugs.

The fabric used is a three-dimensional woven fabric of carbon fibers, i.e. a fabric of relatively large thickness made up of reinforcing fibers that are woven together in three dimensions. By way of example, such a three-dimensional fabric corresponds to a 2.5 D type fabric.

Such a fabric has a plurality of layers of longitudinal fibers, and a plurality of layers of transverse fibers that are woven together in such a manner that the fibers extending in one direction are interlinked with the fibers in a plurality of other layers in order to constitute a non-separable fabric.

The fabric may optionally be reinforced in the clevises: some of the fibers of the various layers are then no longer interlinked in the clevises so as to leave layers that are not mutually interlinked. This makes it possible to insert additional layers in the clevises in order to increase their thickness.

Additional fibers extending substantially perpendicularly to the plane of the layers may subsequently be stitched through the various layers making up the clevises in order to secure them to one another.

Fabricating such a clevis consists in folding the piece of fabric shown in FIG. 2, which piece of fabric is optionally reinforced in its clevises, by applying it onto a mandrel or the like and then bringing together its two opposite edges. The edges can then be connected together, e.g. by stitching, prior to injecting resin into the reinforcing fiber fabric and heating the assembly in order to polymerize the resin.

The nominal thickness of the wall forming the connecting rod is limited by the thickness of the three-dimensional fabric that is used for making it, given that deciding to use a thick fabric increases the cost of such a fabric very considerably, in particular because it involves reducing the speed of weaving very considerably.

In practice, given current sales costs, it is not possible to envisage using a fabric having a thickness of more than two or three centimeters. It can be understood that such a limitation on thickness puts a limitation on the forces that can be accepted by the connecting rod in question as a whole, and also by its clevises.

OBJECT OF THE INVENTION

The object of the invention is to provide a solution for remedying the above drawbacks.

SUMMARY OF THE INVENTION

To this end, the invention provides a method of fabricating a connecting rod out of composite material from three-dimensional fabric of woven reinforcing fibers, the connecting rod extending in a main direction, and the method comprising the operations of:

cutting out one or more base pieces from one or more three-dimensional fabrics;

cutting out one or more reinforcing pieces from one or more three-dimensional fabrics;

installing the various pieces on a support in order to shape them in a configuration in which the base pieces and the reinforcing pieces are superposed;

securing the various pieces to one another by stitching with reinforcing fibers in order to constitute a reinforcing fiber preform;

installing the preform on a mandrel; and injecting resin into the preform and polymerizing the resin.

Using this technique, a preform is made presenting thickness that is significantly greater than the thickness of the reinforcing fiber fabric that is used.

The invention also provides a method as defined above, wherein the various pieces are secured to one another by means of at least one operation of stitching together a pair of edges extending along the main direction, the edges belonging to two distinct base pieces in order to secure those two base pieces to each other.

The invention also provides a method as defined above, wherein the various pieces are secured to one another by means of at least one operation of stitching a reinforcing piece against a base piece in order to secure them to each other.

The invention also provides a method as defined above, wherein two base pieces and two reinforcing pieces are used to make up the preform, and wherein the various pieces are secured to one another by at least one operation of stitching together two pairs of superposed edges extending in the main direction, the edges of one of the pairs belonging to two different base pieces, and the edges of the other pair belonging to two distinct reinforcing pieces, and wherein these two pairs of superposed edges are stitched together jointly.

The invention also provides a method as defined above, wherein the edges that are assembled together by stitching are of complementary chamfered shapes in the region where they are stitched together.

The invention also provides a method as defined above, wherein a single stitching operation is performed to secure two edges of two base pieces to each other and to a reinforcing piece.

The invention also provides a method as defined above, wherein a single stitching operation is used to secure two edges of two reinforcing pieces to each other and to a base piece.

DETAILED DESCRIPTION OF THE INVENTION

The invention is based on the idea of making a connecting rod having its wall made up of a plurality of superposed layers of three-dimensional woven fabric so as to achieve considerable thickness without it being necessary to have recourse to thick three-dimensional fabric. In practice, this solution makes it possible to make a connecting rod having a wall of thickness that may be as much as eight to ten centimeters while nevertheless having a cost of fabrication that is particularly competitive.

Figure 1:
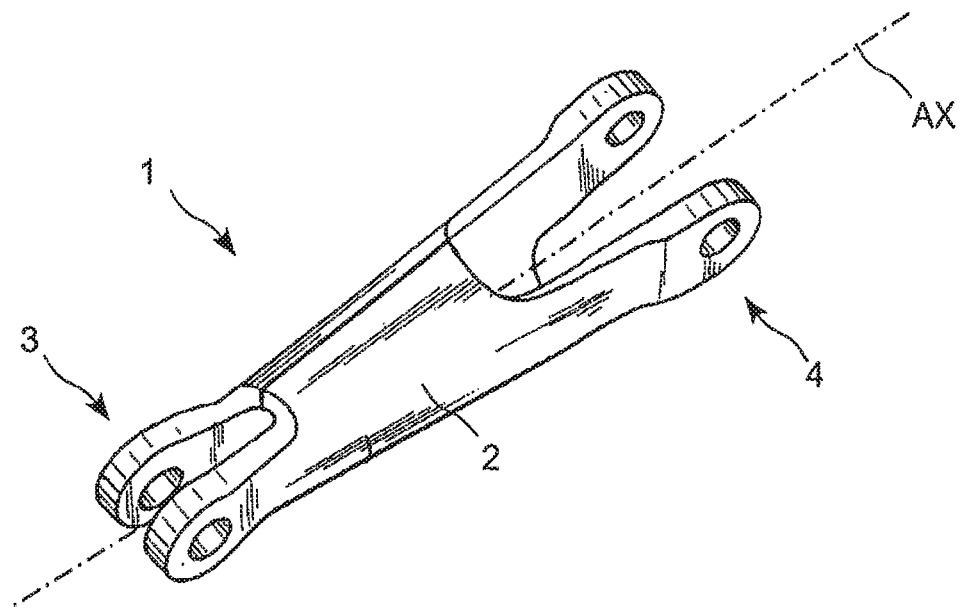
FIG. 1, described above, is an overall view of a known connecting rod.
Figure 2:
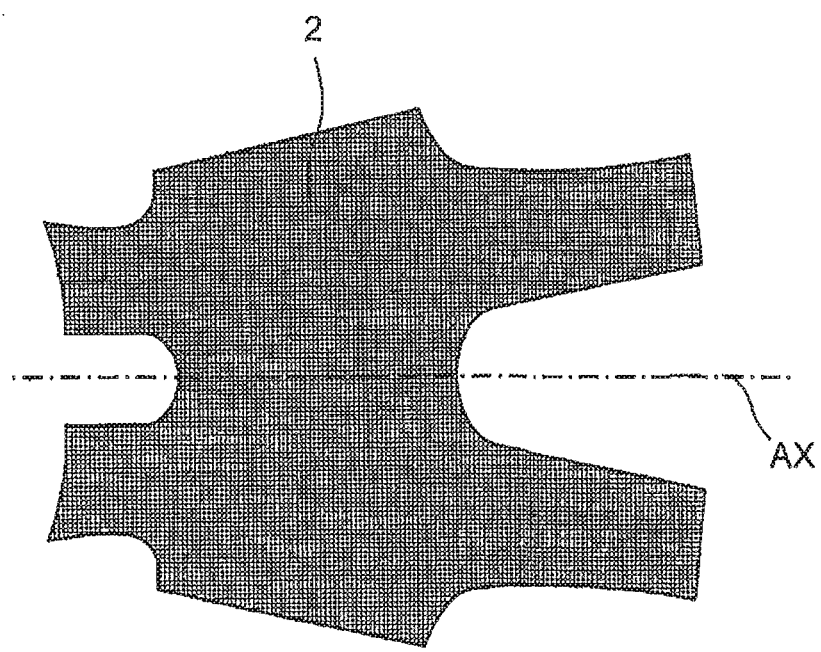
FIG. 2, described above, shows the piece of fabric used for fabricating the FIG. 1 connecting rod.
Figure 3:
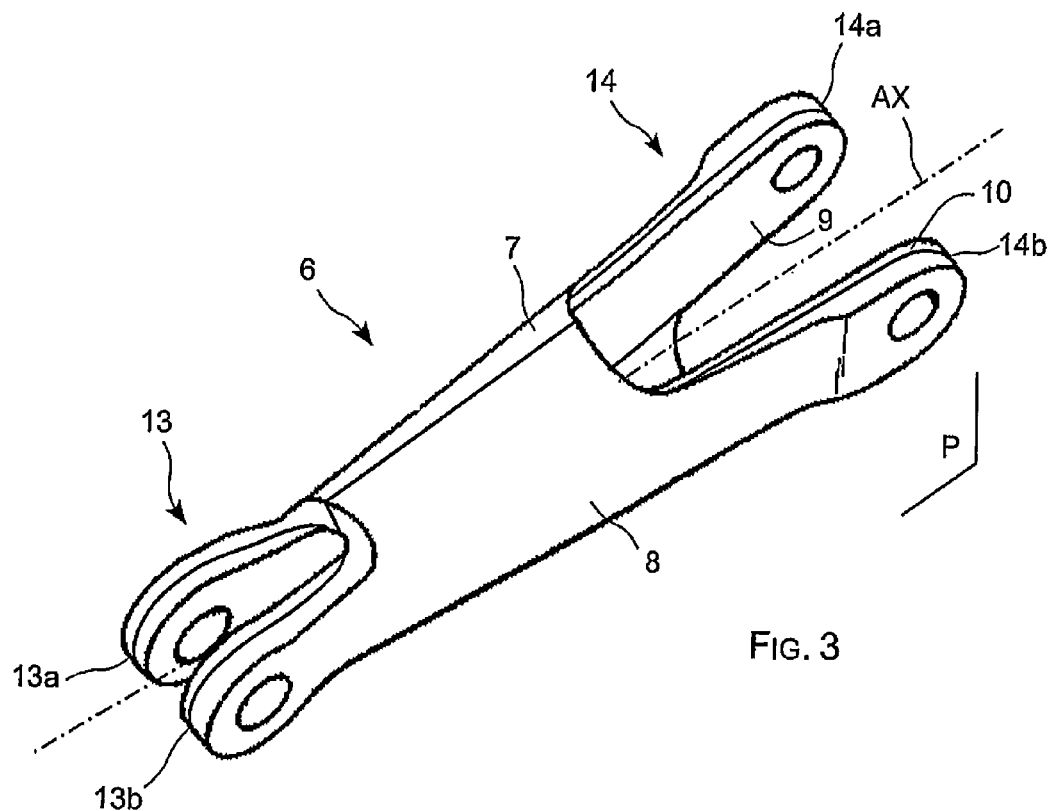
FIG. 3 is an overall perspective view of the connecting rod of the invention.

The connecting rod of the invention is shown in FIG. 3 where it is given overall reference 6, and it is made up of four pieces of three-dimensional fabric, comprising two base pieces 7 and 8, and two reinforcing pieces given references 9 and 10.

The two base pieces 7 and 8 are of shapes that are generally symmetrical relative to each other about a plane P containing the longitudinal axis AX of the connecting rod, with only their chamfered edges being inverted so as to be complementary. In analogous manner, the two reinforcing pieces 9 and 10 are likewise of shapes that are generally symmetrical relative to each other about the plane P.

As can be seen in FIG. 3, the connecting rod comprises a generally tubular central body 12 that is extended at each of its ends by respective two-lug clevises. These clevises are given references 13 and 14 and each of them has two lugs given respective references 13a, 13b, 14a, and 14b.

Figure 4:
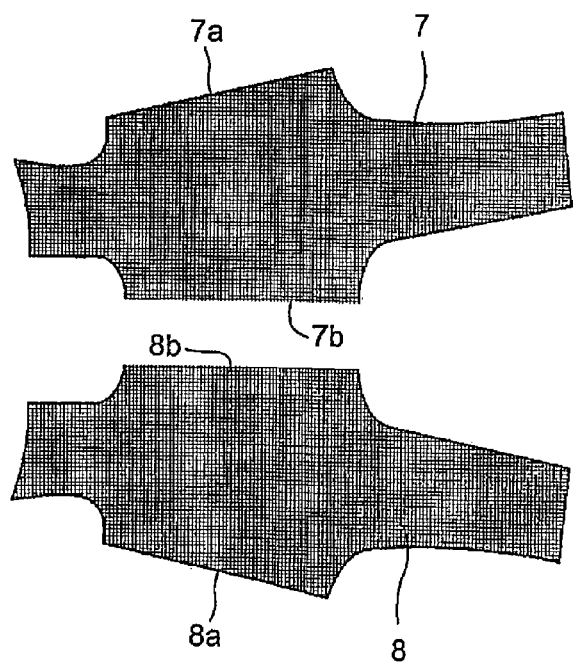
FIG. 4 is a view showing how a three-dimensional fabric is cut out to constitute the base pieces for making the connecting rod of the invention.

Each base piece 7, 8 is made from a piece of three-dimensional fabric having a plane shape defined by an appropriate outline, as shown in FIG. 4. The piece 7 has two generally rectilinear opposite edges referenced 7a and 7b, and the piece 8 has two generally rectilinear opposite edges referenced 8a and 8b. Each reinforcing piece 9, 10 is fabricated from a plane piece of three-dimensional fabric defined by an outline that is generally rectangular or oblong.

Once the pieces of fabric 7, 8, 9, and 10 have been obtained, they are initially assembled to one another. Specifically, the rectangular reinforcing piece 9 is applied against and positioned on the base piece 7 in such a manner as to cover its central portion extending from the region corresponding to the lug 7a as far as the region corresponding to the lug 7b.

The assembly formed in this way is then held in position and stitched together by means of a dedicated machine using reinforcing fibers passing through both thicknesses of three-dimensional fabric, so as to secure the reinforcing piece 9 to the base piece 7.

The procedure is analogous for positioning the reinforcing piece 10 on the base piece 8 prior to securing them to each other, likewise by stitching with reinforcing fibers passing through both thicknesses of three-dimensional fabric.

Once these two elements have themselves been assembled, they are put into place on a support so as to give them the rounded shapes that correspond to the connecting rod.

Once both assemblies are in place, the edges 7a and 8a of the base pieces 7 and 8 are positioned so as to be touching, and in analogous manner the edges 7b and 8b are likewise touching, while nevertheless conforming to an arrangement corresponding to that of the connecting rod as shown in FIG. 3.

At this stage, each pair of touching edges is stitched together, with this being done by stitching reinforcing fibers firstly to secure the edges 7a and 8a together, and secondly to secure the edges 7b and 8b together.

In general, each of the preform assemblies may be positioned relative to the other on a mandrel, prior to proceeding with a single stitching operation serving to assemble together the various pieces.

At this stage, a preform has been made that is constituted by the base pieces 7 and 8 and by the reinforcing pieces 9 and 10 that are secured to one another. The reinforcing pieces are situated on the inside of the wall forming the connecting rod, each extending from one clevis lug to the other clevis lug at the opposite end along the axis AX.

Figure 5:
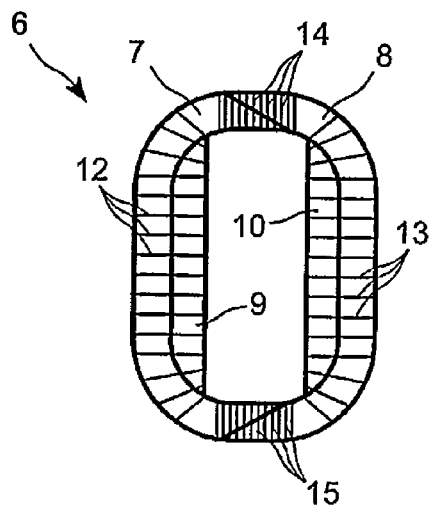
FIG. 5 is a cross-section view of the body of the connecting rod of the invention.

As can be seen in the cross-section of FIG. 5, the reinforcing piece 9 is fastened to the base piece 7 by a set of crossing fibers referenced 12. In analogous manner, the reinforcing piece 10 is fastened to the base piece 8 by another set of reinforcing fibers 13.

The edges 7a and 8a are secured to each other by a set of crossing fibers 14, and the edges 7b and 8b are secured to each other by another set of reinforcing fibers, referenced 15.

Various stitching solutions may be adopted for securing the edges to each other. In the example of FIG. 5, the edges are of chamfered shape, such that they overlie each other in part when they are in position. Under such conditions, the stitching is formed by fibers extending in a direction that is radial relative to the axis AX of the connecting rod, each stitched fiber crossing through a thickness of chamfered three-dimensional fabric corresponding to the piece 7 and through a thickness of chamfered three-dimensional fabric corresponding to the piece 8.

Once the preform has been made up, it is installed on a new mandrel, different from the mandrel used for the stitching operation, and of a shape corresponding to the inside shape of the connecting rod. The assembly is then placed in an appropriate injection mold. At this stage, the resin is injected into the entire preform, and the resin is then polymerized, e.g. by heating for a predetermined duration.

Once the unfinished part has been made in this way, various machining operations are performed, in particular to give the lugs of the clevises their final shapes, and to pierce these clevis lugs, prior to installing bearing-forming metal rings therein.

As can be in particular in FIG. 3, the connecting rod as formed in this way presents significant thickness in its flanks, such that this large thickness serves to provide considerable reinforcement not only to the connecting rod as a whole, but also to the lugs of its clevises, thereby contributing to reducing stresses in the force-insertion zones as constituted by the clevises.

Techniques other than those shown in FIGS. 3 to 5 may advantageously be envisaged for assembling the various pieces of three-dimensional fabric together by stitching in order to make up the preform.

Figure 6:
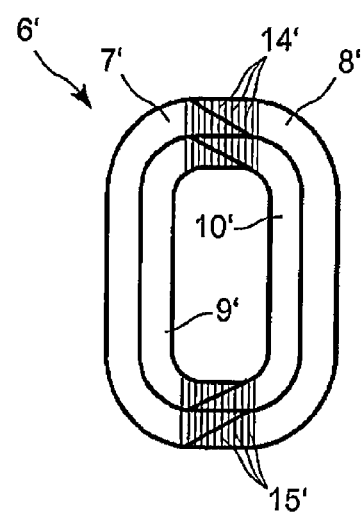
FIG. 6 is a cross-section view of the body of the connecting rod in a second embodiment of the invention.

To this end, the example of FIG. 6 shows another connecting rod in accordance with the invention, having two base pieces 7' and 8' and two reinforcing pieces 9' and 10'. The fabrication of this connecting rod does not include, properly speaking, a step of securing each reinforcing piece to a corresponding base piece.

In the example of FIG. 6, the opposite edges of the base pieces are arranged to be secured to each other by stitching, as in the example of FIGS. 3 to 5, however in this example, the reinforcing pieces 9' and 10' present chamfered opposite edges that are for securing to each other by stitching.

Once the various pieces have been put into place so that relative to one another they are in the arrangement they are to present in the finished connecting rod, one of the pairs of edges of the base pieces 7' and 8' for securing together by stitching extends radially over one of the pairs of edges of the reinforcing pieces 9' and 10' that are to be secured to each other by stitching, running therealong, as can be seen in the top portion of FIG. 6.

In analogous manner, the other pair of edges of the base pieces 7' and 8' for securing to each other extends radially over the other pair of edges of the reinforcing pieces 9' and 10' that are to be secured to each other, as can be seen in the bottom portion of FIG. 6.

A single operation is then performed of stitching together all four edges in the top portion of the preform as seen in section, and another single operation is performed of stitching together all four edges in the bottom portion of the preform as seen in section, thereby serving to secure to one another the various pieces making up the preforms while also simultaneously securing the various edges to one another.

Figure 7:
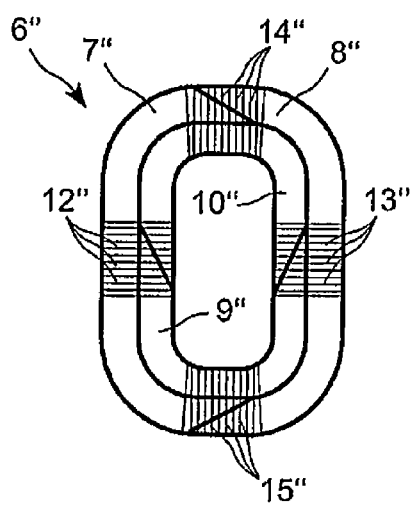
FIG. 7 is a cross-section view of the body of the connecting rod in a third embodiment of the invention.

In analogous manner, it is also possible to offset the reinforcing pieces angularly around the longitudinal axis of the connecting rod, as shown diagrammatically in FIG. 7.

In FIG. 7, the connecting rod is likewise made up of two base pieces 7" and 8", and of two reinforcing pieces 9" and 10", however these various components are assembled by means of four sets of stitching, each serving to secure together two edges and to secure those two edges to a third element.

As can be seen in FIG. 7, this assembly comprises stitching 12" situated in the left portion of the section of the connecting rod and crossing through the base piece 7" together with two contiguous edges of the reinforcing pieces 9" and 10". In analogous manner, other stitching 13" situated in the right portion of FIG. 7 crosses through the base piece 8" and through two other contiguous edges of the reinforcing pieces 9" and 10".

Furthermore, stitching 14" situated in the top portion of the cross-section crosses through two contiguous edges of the base pieces 7" and 8" and also through the reinforcing piece 10". Other stitching 15" situated in the bottom portion of the cross-section crosses through two other contiguous edges of the base pieces 7" and 8", and also through the reinforcing piece 9".

It can readily be understood that, in this example, assembling together the various components consists in beginning by performing the stitching 12" and 13" prior to performing the stitching 14" and 15" in order to make up a preform ready for receiving a mandrel for installing in an injection mold where resin is injected and then polymerized.

In the example of FIGS. 3 to 5, the reinforcing pieces are arranged in such a manner as to enable them to reinforce the lugs of the clevises of the connecting rod by increasing their thickness.

It should be observed that the thickness of the clevis lugs may be further increased by inserting additional layers of fabric therein. In other words, the invention does not in any way exclude the possibility of having non-interlinked fabric layers of the three-dimensional fabric in each clevis in order to be able to insert layers of two-dimensional woven fabric therein prior to securing them all together by stitching using transverse reinforcing fibers.

As mentioned above, and as can be seen in the examples of the various figures, the edges that are stitched together are advantageously of complementary chamfered shapes, so that when they are in position one against the other, together they form a portion of fabric that presents thickness that is substantially constant and that corresponds to the nominal thickness of the three-dimensional fabric in which they are made.

Furthermore, this chamfered shape for the assembled-together edges facilitates the stitching operation, since it then consists merely in making stitches through the chamfered portions which are superposed one on the other.

In yet another embodiment, the pieces of fabric 7, 8, 9, and 10, or 7', 8', 9', and 10', or 7", 8", 9", and 10" are cut out from different three-dimensional fabrics. This makes it possible to use materials having the best-suited characteristics.

By way of example, mention can be made of the pieces 7 and 8 being made of a fabric having particular properties for withstanding impacts, while the pieces 9 and 10 are taken from a fabric having superior properties in compression.

In the examples shown in the figures, the stitching is performed in such a manner that the stitched fibers extend radially relative to the general direction of the connecting rod. In other words, each stitched fiber extends in a direction that is normal to the outside face of the connecting rod in the region where the fiber is stitched.

Advantageously, the fibers may also be stitched in one or two directions that are oblique relative to the radial direction, so as to oppose shear stresses that may appear between the layers of the connecting rod when it is itself stressed. Under such circumstances, the stitched fibers are then inclined relative to the normal to the outside face in the region of the stitching.

Figure 8:
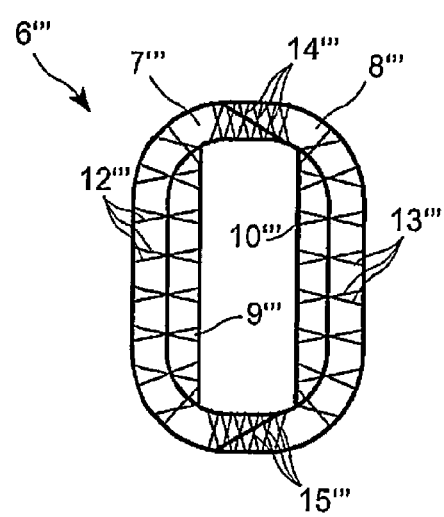
FIG. 8 is a cross-section view of the body of the connecting rod in a fourth embodiment of the invention.

The implementation of such a technique for arranging the pieces of FIG. 5 is shown in FIG. 8. In this example, the connecting rod 6''' has a reinforcing piece 9''' fastened to a base piece 7''', and in analogous manner a reinforcing piece 10''' fastened to the other base piece 8'''.

As can be seen clearly in FIG. 8, these various elements are fastened to one another by fibers 12''', 13''', 14''', and 15''' that are stitched in different oblique directions so as to be effective in opposing relative slip between the various layers, in particular when the connecting rod is stressed in twisting.

The invention claimed is:
1. A method of fabricating a connecting rod (6-6''') out of composite material from three-dimensional fabric of woven reinforcing fibers, the connecting rod (6-6''') extending in a main direction (AX), and the method comprising the operations of:
  cutting out two or more base pieces (7-7''', 8-8''') from one or more different three-dimensional fabrics;
  cutting out two or more reinforcing pieces (9-9''', 10-10''') from one or more different three-dimensional fabrics;

installing the two or more base pieces and two or more reinforcing pieces (7-7''', 8-8''', 9-9''', 10-10''') on a support in order to shape the base pieces and reinforcing pieces in a configuration in which the base pieces and the reinforcing pieces are superposed;

securing the two or more base pieces and two or more reinforcing pieces (7-7''', 8-8''', 9-9''', 10-10''') to one another by stitching (12-12''', 13-13''', 14-14''', 15-15''') with reinforcing fibers in order to constitute a reinforcing fiber preform;

installing the preform on a mandrel; and injecting resin into the preform and polymerizing the resin, wherein the two or more base pieces and the two or more reinforcing pieces (7-7''', 8-8''', 9-9''', 10-10''') are secured to one another by means of at least one operation of stitching together a pair of edges (7a, 8a, 7b, 8b) extending along the main direction (AX), the edges belonging to two distinct base pieces (7-7''', 8-8''') in order to secure said two distinct base pieces to each other.

2. The method according to claim 1, wherein the two or more base pieces and two or more reinforcing pieces (7-7''', 8-8''', 9-9''', 10-10''') are secured to one another by means of at least one operation of stitching a reinforcing piece (9-9''', 10-10''') against a base piece (7-7''', 8-8''') in order to secure said reinforcing piece and said base piece to each other.

3. The method according to claim 1, wherein the edges that are assembled together by stitching are of complementary chamfered shapes in a region where they are stitched together.

4. The method according to claim 1, wherein a single stitching operation is performed to secure two edges of two base pieces (7'', 8'') to each other and to a reinforcing piece (10'').

5. The method according to claim 1, wherein a single stitching operation is used to secure two edges of two reinforcing pieces (9'', 10'') to each other and to a base piece (7'').

6. The method according to claim 1, wherein the two or more base pieces and the two or more reinforcing pieces (7-7''', 8-8''', 9-9''', 10-10''') are secured to one another by means of at least one operation of stitching a reinforcing piece (9-9''', 10-10''') against a base piece (7-7''', 8-8''') in order to secure them to each other.

7. The method according to claim 1, wherein two base pieces (7', 8') and two reinforcing pieces (9', 10') are used to make up the preform, and wherein the two or more base pieces and two or more reinforcing pieces (7', 8', 9', 10') are secured to one another by at least one operation of stitching together two pairs of superposed edges extending in the main direction (AX), the edges of one of the pairs belonging to two different base pieces (7', 8'), and the edges of the other pair belonging to two distinct reinforcing pieces (9', 10'), and wherein said two pairs of superposed edges are stitched together (14', 15') jointly.

8. The method according to claim 7, wherein the edges that are assembled together by stitching are of complementary chamfered shapes in a region where they are stitched together.

9. A method of fabricating a connecting rod (6-6''') out of composite material from three-dimensional fabric of woven reinforcing fibers, the connecting rod (6-6''') extending in a main direction (AX), and the method comprising the operations of:

cutting out two or more base pieces (7-7''', 8-8''') from one or more different three-dimensional fabrics;

cutting out two or more reinforcing pieces (9-9''', 10-10''') from one or more different three-dimensional fabrics;

installing the two or more base pieces and the two or more reinforcing pieces (7-7''', 8-8''', 9-9''', 10-10''') on a support in order to shape the base pieces and reinforcing pieces in a configuration in which the base pieces and the reinforcing pieces are superposed;

securing the two or more base pieces and the two or more reinforcing pieces (7-7''', 8-8''', 9-9''', 10-10''') to one another by stitching (12-12''', 13-13''', 14-14''', 15-15''') with reinforcing fibers in order to constitute a reinforcing fiber preform;

installing the preform on a mandrel; and injecting resin into the preform and polymerizing the resin, wherein two base pieces (7', 8') and two reinforcing pieces (9', 10') are used to make up the preform, and wherein the two or more base pieces and the two or more reinforcing pieces (7', 8', 9', 10') are secured to one another by at least one operation of stitching together two pairs of superposed edges extending in the main direction (AX), the edges of one of the pairs belonging to two different base pieces (7', 8'), and the edges of the other pair belonging to two distinct reinforcing pieces (9', 10'), and wherein the two pairs of superposed edges are stitched together (14', 15') jointly.

10. The method according to claim 9, wherein the edges that are assembled together by stitching are of complementary chamfered shapes in a region where they are stitched together.

* * * * *